March 16, 1971 — J. PATTEN — 3,570,168
FISHING LURE
Filed June 9, 1969
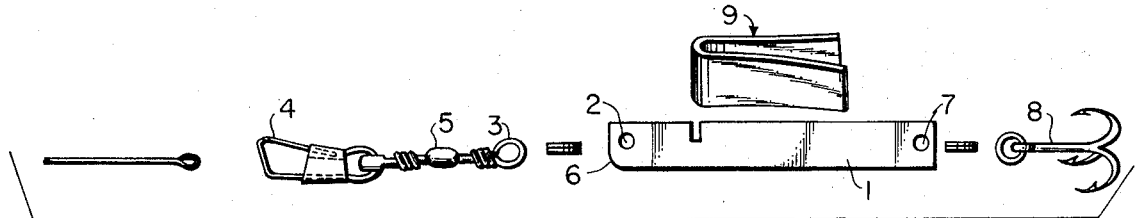
FIG. 1
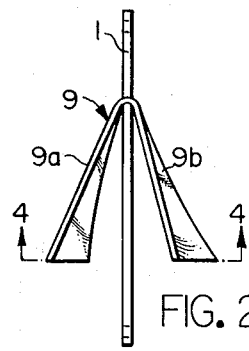
FIG. 2
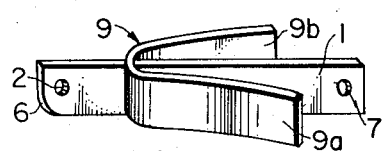
FIG. 5 · FIG. 4
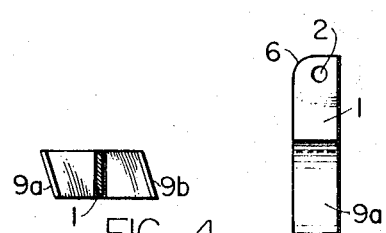
FIG. 3
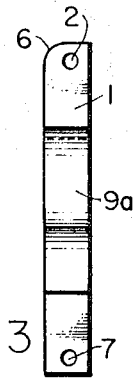
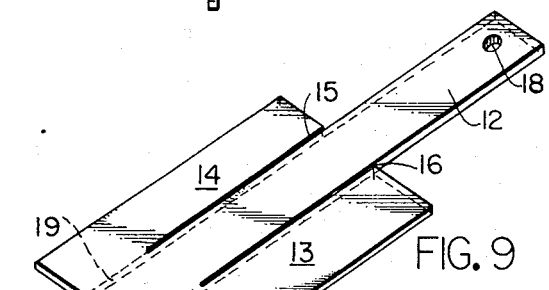
FIG. 9
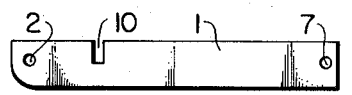
FIG. 6
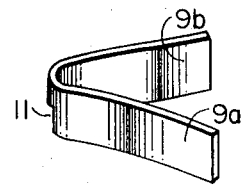
FIG. 8
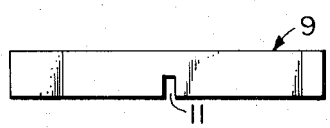
FIG. 7
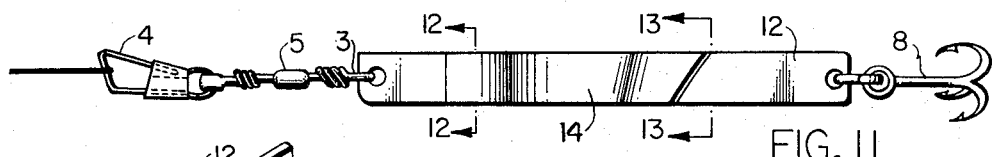
FIG. 11
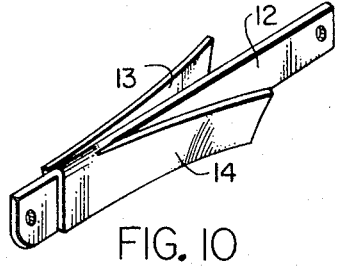
FIG. 10
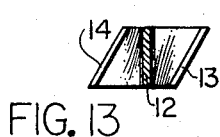
FIG. 13
INVENTOR.
JAMES PATTEN
BY
Jacobi, Davidson & Kleeman
ATTORNEYS United States Patent Office 3,570,168
Patented Mar. 16, 1971

3,570,168
FISHING LURE
James Patten, 1003 Woodland Ave. NW.,
Albuquerque, N. Mex. 87107
Filed June 9, 1969, Ser. No. 831,347
Int. Cl. A01k 85/04
U.S. Cl. 43—42.51                                    6 Claims

ABSTRACT OF THE DISCLOSURE

A fishing lure of sheet material including a body portion, means at one end for attachment to a fishing line, means at the other end for attachment to a hook means and wing elements on opposite sides of the body portion having their trailing edges flared or inclined relative to the body so as to impart a spinning action to the lure as it is pulled through the water.

The present invention relates broadly to the art of artificial bait. More particularly this invention relates to a fishing lure of the spinner type.

The prior art is replete with fishing lures which include vanes, helical formations and the like which cause a lure to spin as it is drawn through the water. Such lures are generally of a complex construction and include various type fastening components that secure a multiplicity of parts together.

Accordingly, it is an object of the present invention to provide a spinner type fishing lure of inexpensive construction and which includes means for attachment to a fishing line and hooks.

It is a more particular object to provide such a fishing lure, embodying a minimum of component parts, that is easy to assemble and is constructed and arranged to simulate or give the appearance of small live bait such as minnows in their natural habitat.

A more particular object of this invention is to provide a fishing lure which includes a body portion and flared wing portions constructed and arranged to impart a spinning action to the lure and insure that the lure will be relatively free from snagging on weeds, reeds, grass and other underwater obstructions during trolling.

It is a still more specific object of the invention to provide an improved fishing lure that can be constructed of sheet materials such as steel, aluminum or synthetic plastic material and which include a body portion having means at one end for attachment to a fishing line, means at the other end for attachment to one or more hooks, wing members extending outwardly from the body portion from a location rearwards of the line attachment means toward, but terminating short of the rear end of the body portion and which wing members are shaped to impart spinning motion to the lure in response to forward motion through the water.

It is another object of the invention to provide a lure of the type contemplated by the immediately aforegoing object in which the sheet material lure is colored in a manner to attract fish or resemble bait fish in the habitat where used.

Further and more specific objects of the invention will be apparent from the following description taken in connection with the accompanying drawings in which:

FIG. 1 is an exploded view illustrating the component parts of the lure of the present invention, FIG. 2 is a top plan view of the lure shown in FIG. 1 in assembled condition, FIG. 3 is a side elevational view of the lure illustrating the location and rearward extent of the wing sections, FIG. 4 is a cross-sectional view taken along line 4—4 of FIG. 2, FIG. 5 is a perspective view of the assembled lure, FIG. 6 is an elevational view of the body section of the the lure, FIG. 7 is an elevational view of the wing section of the lure prior to bending and flaring, FIG. 8 is a perspective view illustrating the wing section in bent and flared condition.

FIG. 9 is a perspective view of a sheet material blank for forming into a modified one-piece lure, FIG. 10 is a perspective view of such a one-piece lure with the hooks and line devices removed, FIG. 11 is a side elevational view of the lure shown in FIG. 10, FIG. 12 is a transverse cross-sectional view taken along line 12—12 of FIG. 11 illustrating the folding of the wing forming sections relative to the body section, and FIG. 13 is a transverse cross-sectional view taken along line 13 of FIG. 11 illustrating the flaring of the trailing edge portions of the lure wing sections.

As illustrated in the drawings, FIGS. 1 to 8, the fishing lure of this invention is constructed of what is termed sheet or strip material, that is a material that is wider than it is thick. The material may be steel, aluminum or a synthetic plastic material that has sufficient strength to withstand the rigors of use.

The lure of the invention includes a body 1 that is rectangular in side elevation, which is provided at one end with an aperture 2 for receiving either a ring 3 or a snap hook 4 on the end of a fishing line that includes a swivel coupling 5 between the snap hook and the eye, either one of which receives the line. This is the nose end of the lure and the lower corner of the nose end is beveled or curved as at 6 so as to assist in imparting undulating motions to the lure when it is drawn through the water. The other end of the body has an aperture 7 therethrough to which is attached a trefoil hook 8. Wing means 9 extend outwardly from both sides of the body toward the rear end thereof and the trailing portions of these wing means are flared or bent so as to impart a swirling or spinning action to the lure when it is pulled through the water.

The drawings indicate that the flare or twist imparted to the trailing portion of the wing means places the rear ends thereof at an inclined position in the same direction, but on opposite sides of the main or body portion 1 of the lure. It is further to be pointed out that the vertical dimension of the wing means is the same as that of the body portion. Thus the lure can be produced from strip material that is cut in two sections, one of which is slightly longer than the other to form the body section 1, and which is drilled to provide the holes 2 and 7 near its opposite ends. Both sections are notched as at 10 and 11, with the width of the notch being the same dimension as the thickness of the strip material and the extent of the notch, inwardly from the edge of each section, being one-half the width of the strip. This permits the wing assembly to be secured to the body section by interengaging the notched portions, to provide a friction or force fit engagement. The wing section 9 is bent and twisted or flared prior to interengagement of the sections, so that each wing element 9a, 9b has the same flare, whereby during pulling of the lure through the water, the same will spin, bob and undulate in a manner resembling live minnows. The swirling or spinning of the lure is proportional to the speed with which it is drawn through the water and the spinning action is directly related to the angle of flare imparted to the wing elements of the lure.

The slotted or notched construction provides a tight force fit between the two sections of the lure. If desired, the wing elements 9a, 9b can have the portions thereof near the bend pressed tightly against the opposite sides of the body 1 and then have the wing elements diverge and be twisted to provide the desired angle of flare. It is to be understood that the angle of flare or direction of twist is the same for both sections or wings of the wing means.

Further, the lure may be made in varying sizes and have different colors imparted to the same to insure best results. The coloring can be uniform over the whole lure or the side portions of the body sections can be colored and the inner faces of the wing sections similarly colored, leaving the outer faces plain so that during spinning, such a lure, when made of steel or aluminum, would have a shiny effect and assist in attracting fish. The fact that the hook is attached at the rear end of the body section insures that during swirling or spinning, the flare of the wing section minimizes the chance of encounter of the treble hook with weeds, grass, reeds or other obstructions commonly encountered during fishing. It is, therefore, clear that the present invention provides a fishing lure that comprises a body having means at one end for attachment to a fishing line, means at the other end for attachment to a hook, a pair of wings extending outwardly from opposite sides of the body in diverging relation with the trailing portions of the wings, being twisted, and having a similar angle of flare with respect to the vertical plane containing the body.

Another embodiment of the invention as shown in FIGS. 9 to 13, is directed to a form in which sheet material, i.e. steel or aluminum, is blanked to provide a central elongated body forming portion 12 and two wing forming portions 13 and 14 defined by slits 15 and 16. Holes 17 and 18 are drilled through the body portion at opposite ends thereof. In constructing the lure, one wing forming portion 13 is folded toward the body forming portion about line 19. The other wing forming portion 14 is oppositely folded toward the body forming portion about fold line 20. The nature of the metal material is such that when pressure is applied during folding, the two wing forming portions are pressed tightly against the opposite sides of the body forming portions. Then the wing forming portions are bent outwardly in diverging relation and twisted to provide the desired and similar angles of flare for each of the wings.

This form of the lure functions the same as that form previously described.

What is claimed is:

1. A fishing lure comprising a substantially vertical body having front and rear ends and a pair of substantially horizontal wings extending outwardly from opposite sides of the body toward the rear and having trailing portions which are flared in the same direction and having similar angles of flare relative to a vertical plane passing through the body.

2. A fishing lure fabricated of sheet or strip material and comprising a substantially vertical body portion having greater width than thickness and including front and rear ends, means at the front end of said body portion for attachment to a fishing line, means at the rear end of said body portion for attachment to hook means, a pair of wings extending on opposite sides of said body portion, said wings having substantially the same width and thickness as the width and thickness of the body portion and extending toward the rear end of said body portion, said wings diverging outwardly from the body portion and being substantially vertical and including a trailing portion bent in the same direction at an angle with respect to the body portion, with the angular relationship being substantially the same, whereby said lure will spin when pulled through the water.

3. A fishing lure as claimed in claim 2 wherein said body portion comprises a straight length of material having a transverse notch extending inwardly from one edge and said wings comprise a bent length of material having a similar transverse notch extending inwardly from one edge at the apex of the bend, said bent length being interengaged with said straight length with said notches in juxtaposition, the free ends of the bent length being adjacent the rear end of said straight length.

4. A fishing lure as claimed in claim 2 wherein at least portions of said body portion and wings are colored.

5. A fishing lure as claimed in claim 2 in which said body portion is integral with said wings.

6. A fishing lure as claimed in claim 5 wherein said wings comprise portions oppositely folded with respect to the upper and lower edges of said body portion.

References Cited

UNITED STATES PATENTS

| 1,519,174 | 12/1924 | Tomlin | 43—42.51 |
| 2,493,692 | 1/1950 | Pareti et al. | 43—42.51 |
| 2,611,987 | 9/1952 | Hagen | 43—42.51 |
| 2,717,468 | 9/1955 | Clough | 43—42.51 |
| 2,849,826 | 9/1958 | Kjormoe | 43—42.51 |
| 3,043,042 | 7/1962 | Mutti | 43—42.51 |

WARNER H. CAMP, Primary Examiner